US006199049B1

(12) United States Patent
Conde et al.

(10) Patent No.: US 6,199,049 B1
(45) Date of Patent: Mar. 6, 2001

(54) VERIFIABLE ELECTRONIC JOURNAL FOR A POINT OF SALE DEVICE AND METHODS FOR USING THE SAME

(75) Inventors: Alberto Gustavo Gonzalez Conde; Robert Scott Fortenberry; Wayne Roger Hucaby, all of Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/164,215

(22) Filed: Sep. 30, 1998

(51) Int. Cl.$^7$ ................................................ G06F 17/60
(52) U.S. Cl. ................................ 705/24; 705/16; 705/21
(58) Field of Search ................................. 705/19, 21, 24, 705/16, 75, 76; 380/30; 713/168, 170, 173, 175, 176, 180, 181

(56) References Cited

U.S. PATENT DOCUMENTS

| 4,144,567 | 3/1979 | Tadakuma et al. | 705/19 |
| 4,186,439 | * 1/1980 | Shimura et al. | 705/24 |
| 4,213,179 | * 7/1980 | Hamano et al. | 705/24 |
| 4,276,598 | * 6/1981 | Inoue et al. | 705/24 |

(List continued on next page.)

FOREIGN PATENT DOCUMENTS

| 2297414 | 7/1996 | (GB) . |
| 9636948 | 11/1996 | (WO) . |
| WO 96/36948 | * 11/1996 | (WO) . |
| 96/36948 | 11/1996 | (WO) . |

OTHER PUBLICATIONS

International Search Report PCT/GB 99/03105.
"Case Study: Signature Pioneer", Chain Store Age Executive, vol. 69, No. 11, Section 2, pp. 5a, Nov. 1993.*

Primary Examiner—James P. Trammell
Assistant Examiner—Richard W. Hess
(74) Attorney, Agent, or Firm—John D. Flynn; Myers, Bigel, Sibley & Sajovec, P.A.

(57) ABSTRACT

A point of sale device having a verifiable electronic journal system which maintains an electronic journal file in lieu of using a journal print station. Transaction information is first stored in a non-volatile random access memory. A data signature is determined based on the contents of the random access memory for a journal. Both the transaction information and the data signature are transferred to the separate journal memory. The journal memory may, for example, reside on the point of sale terminal and tampering with the journal transaction information may be detected by reference to the data signature which is also transferred and maintained in the electronic journal file. Preferably, the data signature is encrypted such as by a shared key encryption scheme and the associated public key is also transferred and stored in the electronic journal file from the device, such as a fiscal base, which is tracking the transaction information as it is created. A hashing technique is preferably used so that a comparatively small NVRAM may be utilized to support generation of a transaction information set for an electronic journal file for a journal period. Accordingly, the data signature is an encrypted version of a message digest which is a running value reflecting the total of transaction information passed to the electronic journal file during a journal period.

40 Claims, 6 Drawing Sheets

U.S. PATENT DOCUMENTS

| | | | |
|---|---|---|---|
| 4,312,037 | * | 1/1982 | Yamakita .................................. 705/24 |
| 4,328,544 | * | 5/1982 | Baldwin et al. ......................... 705/24 |
| 4,425,619 | * | 1/1984 | Matsuda et al. ......................... 705/24 |
| 4,484,277 | | 11/1984 | Uesugi .................................. 364/405 |
| 4,485,441 | * | 11/1984 | Nakatani et al. ....................... 705/24 |
| 4,493,038 | * | 1/1985 | Bovio et al. ............................ 705/24 |
| 4,502,120 | * | 2/1985 | Ohnishi et al. ......................... 705/21 |
| 4,508,962 | * | 4/1985 | Yamasaki ............................... 705/24 |
| 4,564,904 | | 1/1986 | Kumagai ............................... 364/405 |
| 4,852,042 | * | 7/1989 | Zur Muhlen et al. .................. 705/24 |
| 5,214,698 | * | 5/1993 | Smith, Sr. et al. .................... 380/280 |
| 5,335,169 | | 8/1994 | Chong .................................... 705/19 |
| 5,544,086 | * | 8/1996 | Davis et al. ............................ 705/68 |
| 5,644,724 | | 7/1997 | Cretzler .................................. 705/19 |
| 5,774,872 | | 6/1998 | Golden et al. ......................... 705/19 |
| 5,924,077 | * | 7/1999 | Beach et al. ............................ 705/10 |
| 6,021,201 | * | 2/2000 | Bakhle et al. ......................... 713/189 |

* cited by examiner

VERIFIABLE ELECTRONIC JOURNAL FOR A POINT OF SALE DEVICE AND METHODS FOR USING THE SAME

FIELD OF THE INVENTION

The present invention relates to point of sale systems in general and in particular to journals for such transaction based devices. The present invention further relates to methods for using point of sale systems.

BACKGROUND OF THE INVENTION

Face to face retail sales transactions take place at the point of sale or what is commonly referred to as the checkout line or counter. It is at this location that the customer pays for the goods purchased, typically by either cash, check, charge or debit card. To effectuate the sale, many retailers presently use electronic devices to facilitate and provide a record of transactions. Such a point of sale system may include a scanner for reading coded product information, a terminal for manual entry of transaction information and storage of currency, a display for displaying transaction information and a printer which may be used to produce a documentary record or journal for the business and a printed receipt for the customer.

As part of the check out procedure, the sales price of each item purchased is typically entered into the point of sale terminal. Each item price and a total is printed by the point of sale printer on a customer receipt and may also be printed on a separate journal by the same point of sale printer. A tax due is commonly also determined and printed on the customer receipt. The customer receipt is then provided from the printer to the customer.

In a two station point of sale printer, the second printer station maintains a journal record of all sales transactions. This provides a written record for auditing sales activity such as gross sales amounts and taxes collected during a journal period covered by the journal record. This information could be used, for example, by a taxing authority to determine if a retailer has submitted payment to the taxing authority of all taxes collected from customers.

Where governmental authorities acquire an interest in retail journal information, such as through value added tax laws or sales tax laws, the respective tax laws frequently define the format and content of printed receipts and mandate secure methods of sales data capture. It is known to respond to such "fiscal" requirements by providing a fiscal printer such as the 3F printer from International Business Machines, Inc. of Armonk, N.Y. With such a fiscal printer, a secure (i.e., tamper-evident or resistant enclosure) logic card with dedicated nonvolatile random access memory (NVRAM) and electronically programmable read only memory (EPROM) may be placed both physically and logically between a point of sale terminal and a point of sale printer which generates customer receipts and journal records.

With a fiscal printer, such as the Model 3F, the point of sale terminal may be connected to a fiscal base device which is secured to the point of sale printer and which controls all printing functions by a communications link such as a serial communications link. An example of such a fiscal base is illustrated in FIG. 1.

Point of sale terminal 10 is connected to fiscal base 24 over communications link 22. Fiscal printer 20 in turn includes both fiscal base 24 and two station printer 26.

Fiscal base 24 includes a fiscal processor 28 or other control means for controlling journal and printing operations. Fiscal base 24 further includes a battery backed (nonvolatile) random access memory 30 to store intermediate sales and tax totals during a journal period. As shown in FIG. 1, fiscal base 24 further includes a separate program EPROM 32 and fiscal memory EPROM 34. A separate fiscal memory EPROM 34 is provided, encased in epoxy, for permanent storage of data, which typically includes daily sales and tax totals for some number of daily journal periods depending upon the capacity of fiscal memory EPROM 34. Program EPROM 32 may then be used for program information or data values used by fiscal processor 28. Also shown in FIG. 1 is a time of day clock 36 which may be used for tracking transactions and journal periods.

Two station printer 26 is controlled by fiscal processor 28. A first printing station provides a customer receipt station whose printing is controlled by fiscal processor 28 to assure that the sales receipt provided to the customer has the correct data on it related to a particular transaction. The second station provides a journal station which records transaction by transaction sales data and daily reports. The paper journals from the journal station of printer 26 are, typically, subsequently stored for tax audit purposes pursuant to the fiscal laws of various taxing authorities.

Various countries with fiscal taxing laws have expressed an interest in replacing the current system of journal paper tape storage with a digital electronic journal record. Such a transition could reduce equipment, consumable, record-handling and storage costs for retailers. It could allow the use of single station lower cost printers and halve paper consumption. While both retailers and fiscal authorities may recognize the potential advantages of an electronic journal, there are continued concerns that such electronic journal files could be readily modified by an end user intent on defrauding the government.

One proposed solution also relying on a fiscal printer device approach but using an electronic journal has been proposed. This approach utilizes a checksum calculated from all of the data stored in the fiscal secured memory using a key that is not known outside the fiscal printer. The entire journal data block may then be transferred from the fiscal base 24 to a point of sale terminal 10 rather than being maintained in the secure fiscal printer. However, this approach fails to address all of the objectives for such a verifiable electronic journal system. For example, to validate the data in the point of sale terminal, the data must be fed back to the fiscal base where an associated checksum can be obtained from fiscal memory and compared to a new checksum generated from the data downloaded from the point of sale terminal. Furthermore, depending upon the size of the journal unit transferred to and from the point of sale terminal, a large volume of nonvolatile random access memory may be required in the fiscal base. In addition, it may be necessary to sustain data in fiscal memory EPROM for a greater period of time for potential verification requiring an increased size of fiscal memory EPROM. Finally, this approach is limited in that it does not readily allow for remote verification of journal records.

SUMMARY OF THE INVENTION

Accordingly, it is an object of the present invention to provide a verifiable electronic journal system for a point of sale device which allows detection of any tampering with journal data.

It is a further object of the present invention to provide such a verifiable electronic journal system for a point of sale device which does not require an increase in the size of NVRAM or the secure EPROM contained on the printer device such as a fiscal base.

It is a further object of the present invention to provide a verifiable electronic journal system for a point of sale device which may be remotely verified.

These and other objects are provided according to the present invention by a verifiable electronic journal system for a point of sale device which maintains an electronic journal file in lieu of a journal print station on a two station point of sale printer. Transaction information is stored in a nonvolatile random access memory. A data signature is determined based on the contents of the random access memory for a journal. Both the transaction information and the data signature are transferred to the separate journal memory. The journal memory may, for example, reside on the point of sale terminal and tampering with the journal transaction information may be detected by reference to the data signature which is also transferred and maintained in the electronic journal file. Preferably, the data signature is encrypted such as by a shared key encryption scheme and the associated public key is also transferred and stored in the electronic journal file from the device, such as a fiscal base, which is tracking the transaction information as it is created. A hashing technique is preferably used so that a comparatively small NVRAM may be utilized to support generation of a transaction information set for an electronic journal file for a journal period. Accordingly, the data signature is an encrypted version of a message digest which is a running value reflecting the total of transaction information passed to the electronic journal file during a journal period.

In one embodiment of the present invention, a method for providing a verifiable electronic journal system for a point of sale device is provided. Transaction information related to transactions, such as retail sales and taxes on those sales, is received. The transaction information is stored in a random-access memory which is located within the point of sale device. A data signature is determined based on the transaction information contained in the random access memory responsive to a journal update event. The transaction information contained in the random-access memory is then transferred to a first portion of a journal memory separate from the random-access memory responsive to the journal update event. The journal memory is preferably maintained in a point of sale terminal coupled, such as over a communications network, to the point of sale device. The data signature is transferred to a second portion of the journal memory responsive to the journal update event.

In further embodiments of the method aspects of the present invention, the transaction information is also transmitted to a printer for printing, for example, to print a customer sales receipt. The printer may be a fiscal printer and the point of sale device may be a fiscal processor card integrated in the fiscal printer. The transaction information may include sales amount information on transactions and receiving the transaction information may be followed by calculating a tax due based on the sales amount information. Alternatively the transaction information may include a tax due.

In a further aspect of the present invention, the journal update event may be generated responsive to completion of a journal period. Alternatively, using a technique such as a hashing function, the journal update event may be generated when a predetermined amount of transaction information is stored in the random access memory and the random-access memory may be reused to store additional transaction information by overwriting previously stored transaction information. A plurality of journal update events may be generated during a journal period and operations of storing the transaction information, determining a data signature, transferring the transaction information, transferring the data signature and reusing the random-access memory are then repeated for each of the journal update events during the journal period according to the hashing function thereby periodically transferring a block of transaction information stored in the random-access memory to the journal memory while determining the data signature as a running value associated with the transaction information received during the journal period.

In yet another aspect of the present invention, security may be provided by encrypting the data signature using a shared key. The shared key is then transferred to a third portion of the journal memory responsive to at least one of the plurality of journal update events. The verifiable electronic journal system may then be audited. Auditing operations for the embodiments of the present invention utilizing an encrypted data signature include decrypting the data signature in the second portion of the journal memory using the shared key in the third portion of the journal memory. In addition, a verification data signature is determined from the transaction information in the first portion of the journal memory using the hashing technique. The verification data signature is compared to the decrypted data signature to determine if the transaction information in the first portion of the journal memory has been modified from the transaction information transferred from the random-access memory during the journal period.

While the invention has been described above primarily with respect to the method aspects of the invention, both systems and computer program products are also provided. For example, a point of sale device having a verifiable electronic journal system is provided including a means for receiving transaction information and a means for determining a journal update event. A random-access memory is coupled to the means for receiving which is configured to store the transaction information. A means responsive to the journal update event determines a data signature based on the contents of the random access memory. Also provided is a journal memory having a first portion configured to store the transaction information and a second portion configured to store the data signature. The journal memory is separate from the random-access memory and, preferably, is located remote from and communicatively coupled to the point of sale device, such as over a communications network. A means responsive to the journal update event is provided for transferring transaction information from the random-access memory to the first portion of the journal memory and the data signature from the means for determining a data signature to the second portion of the journal memory.

Accordingly, the present invention provides for a verifiable electronic journal system that may be used in lieu of a printed journal record. This provides for reduced costs and the added capability for remote auditing of the journal, such as by a taxing authority, over a computer communications network, while still maintaining, the ability to detect tampering. The present invention may be advantageously implemented using existing hardware such as existing fiscal printer devices.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods, systems or computer program products. Accordingly, the present invention may take the form of a hardware embodiment, a software embodiment or an embodiment combining software and hardware aspects.

The present invention provides methods and systems for electronic journaling which maintain control over printed and journaled transaction information such as sales and tax data. Preferably, data security is provided using standard data security algorithms. More particularly, a shared keyed methodology, such as that provided by RSA Data Security, Inc. is utilized. For each point of sale device, a public (shared) and private key is generated and stored in its secured memory. An electronic journal file is created, such as at the point of sale terminal associated with the point of sale device, with the contents of the journal controlled by the point of sale device (such as a fiscal logic circuit).

Figure 2:
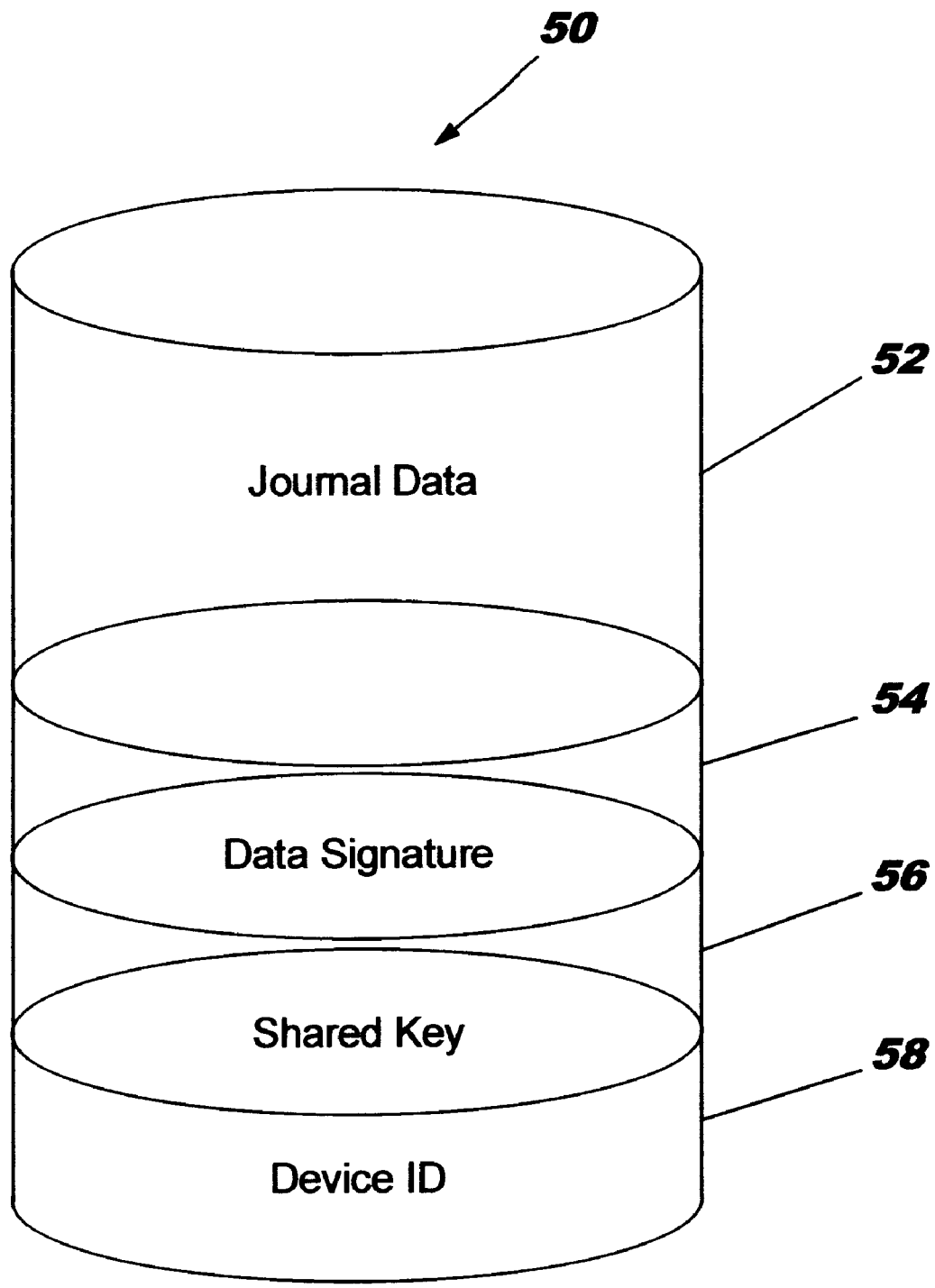
FIG. 2 is a block diagram of a verifiable electronic journal according to an embodiment of the present invention.

The various portions of the electronic journal file or memory for a particular embodiment of the present invention are illustrated in FIG. 2. Electronic journal file 50 includes a first portion 52 containing an unencrypted listing of the transaction information, for example, the data that would be printed to the paper roll and/or journal station of a current fiscal printer. A data signature is stored in second portion 54 of electronic journal file 50. The data signature is preferably an encrypted value used to verify that the print data from portion 52 has not been altered. A printer public or shared key is stored in portion 56 which is used to decrypt the data signature for the purposes of verifying the data integrity. Finally, in the illustrated embodiment, a printer serial number is stored in portion 58 of electronic journal memory 50 to validate that the public (shared) printer key in portion 56 is correct for the respective device. As the use of public/private keyed encryption algorithms are generally known, their operation will not be described in further detail herein except in connection with the particularized use of the shared key in the methods and systems of the present invention.

As will be described further herein, the use of an electronic journal memory 50 according to the methods and systems of the present invention provides a tamper-evident electronic journal. The resulting journal data is provided in a manner that is both freely usable by the retailer for generating its own reports, and auditable, for example, by a taxing authority. Furthermore, this auditing may be carried out either remotely by a government authority using a special utility or onsite using the device, such as a POS terminal, containing the verifiable electronic journal file.

Operations of the present invention will now be described with respect to the flowcharts of FIG. 3 and, subsequently, FIG. 6. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instruction, may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions. 9

Figure 3:
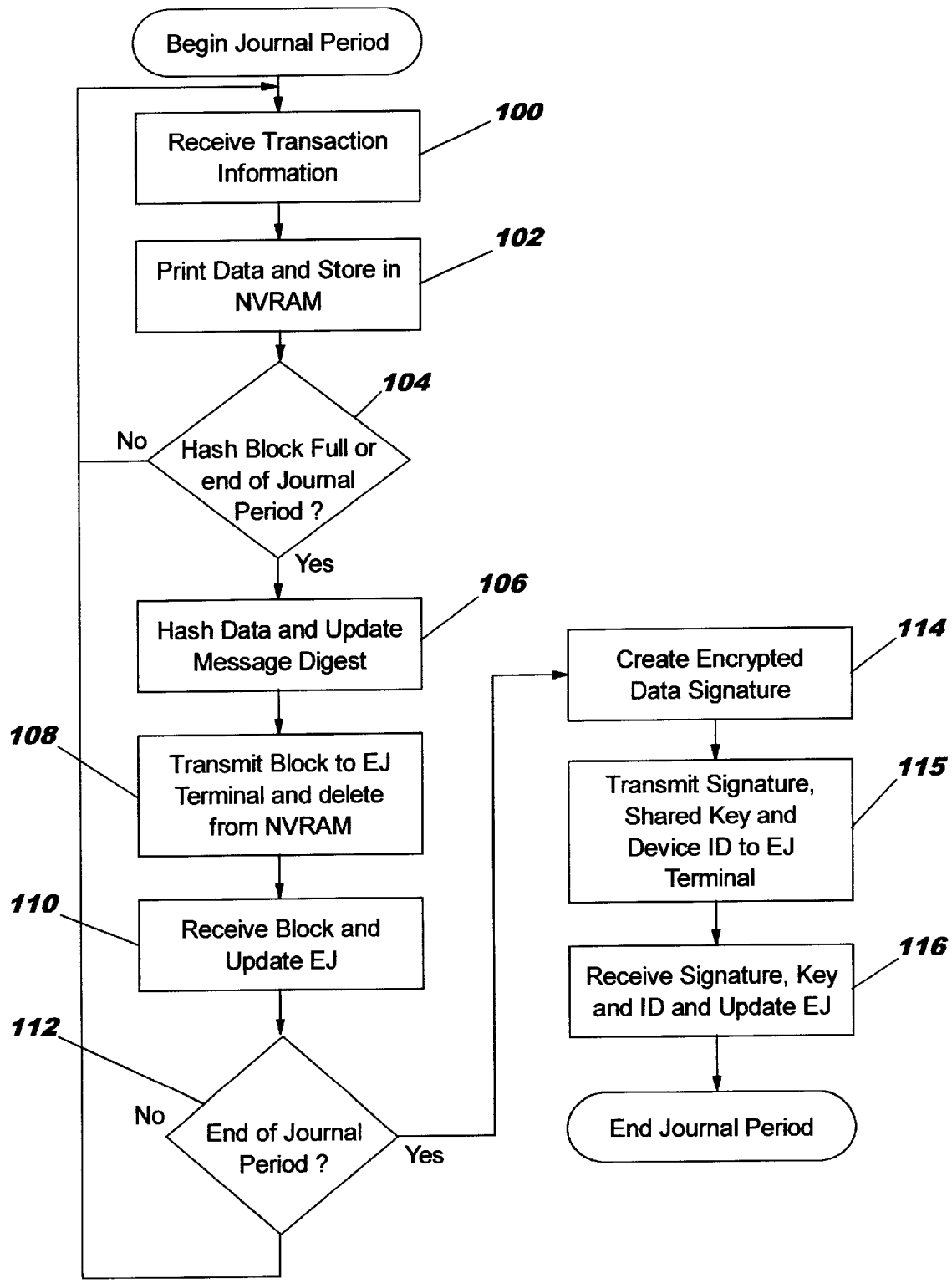
FIG. 3 is a flowchart illustrating operations for creating a verifiable electronic journal file according to an embodiment of the present invention.

Referring now to the flowchart of FIG. 3, during point of sale operations, the point of sale device of the present invention, such as a fiscal processor card, generates print and journal data by known procedures (block 100). This transaction information is handled, in part, according to known procedures by sending customer receipt information to a point of sale printer (block 102). However, the journal data is buffered and stored in a NVRAM of the point of sale device instead of being transmitted to the printer journal station of a two station printer as is currently done (block 102).

It is desirable, however, to limit the amount of data which is maintained in the NVRAM, of a point of sale device such as a fiscal base. By limiting the size of the buffer required for the electronic journal system, the cost of NVRAM is minimized along with the time for individual data transfers to the point of sale terminal or other upstream device on which the electronic journal file is maintained. Accordingly, to enable periodic clearing of the NVRAM containing the current buffer of journal transaction information, "hashing" techniques are used. Known hashing techniques for memory management allow blocks of buffered memory contents to be successively transferred while maintaining a small running value, sometimes referred to as a message digest, that mathematically uniquely corresponds to the entire transferred contents of information. The application of such a hashing technique according to the present invention is further illustrated in FIG. 4.

At block 104 of FIG. 3, the point of sale device determines if a hash block is full. If the hash block is not yet full, operations return to block 100 as additional transaction information is received. At block 106, once a hash block is full, or a journal period ends with a partially full hash block, the processor of the point of sale device, for example, the fiscal processor of a fiscal base, hashes the block of data to create a running message digest at block 106. The fiscal processor then sends the original data from the hash block to the point of sale terminal or other device where the electronic journal file is being maintained and deletes that block from the local NVRAM as illustrated at block 108.

The point of sale terminal or other journal maintaining device appends the most recently received data block to the print data portion 52 of the electronic journal file 50 as illustrated at block 110. At block 112, the system determines whether a journal period is completed which would trigger closing out the currently utilized electronic journal file 50. If not, operations return to block 100 through block 112 continuing receipt and hashing of transaction information.

If the journal period is completed, the fiscal processor creates a data signature value by encrypting the message digest (block 114) and then transmits the data signature and the printer public or shared key for storage in respective portions 54, 56, of electronic journal file/memory 50 (block 115). In embodiments where encryption is not used, the message digest itself is transmitted as the data signature at block 115 and there is no public or shared key to transmit. A device identifier, such as a serial number of the generating device, may also be transferred.

At block 116, the receiving point of sale terminal or other upstream device maintaining the electronic journal file appends the receive data signature and printer public key to the print data in the electronic journal file 50. This completes a journal period and closes the electronic journal file 50. In embodiments including transfer of a device identifier, the identifier is also appended.

Figure 4:
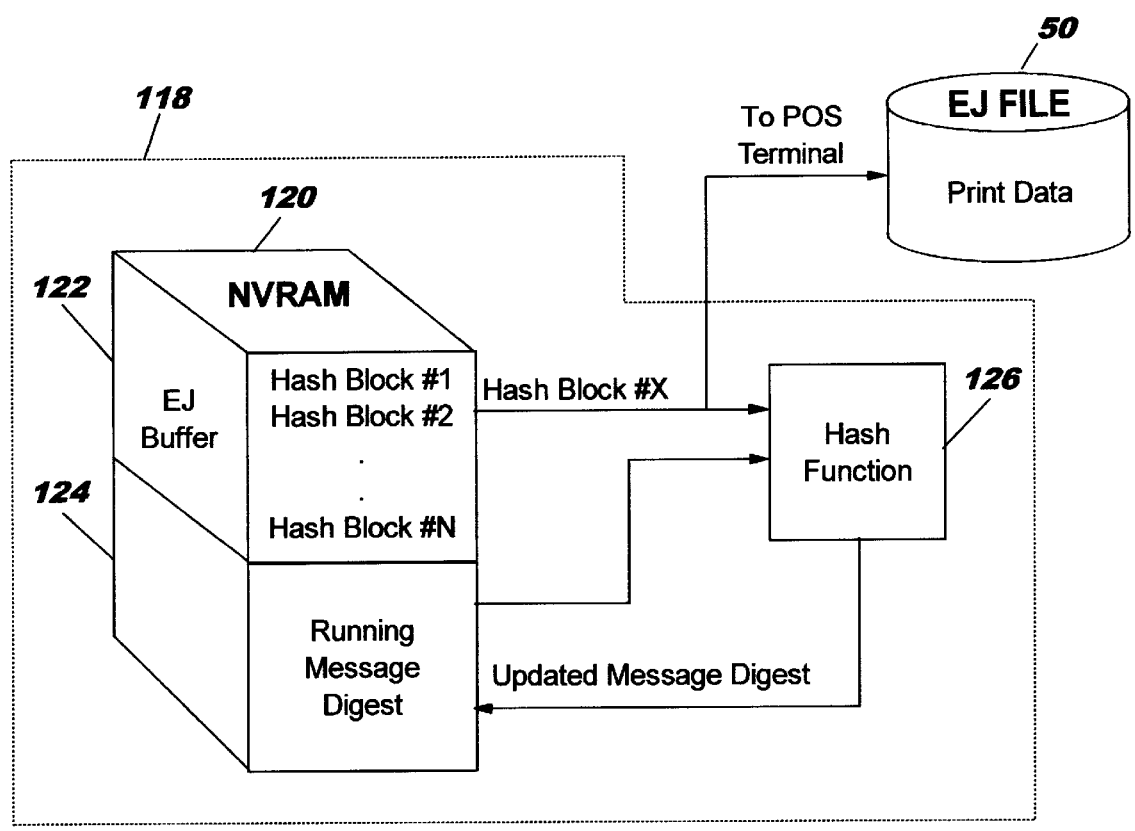
FIG. 4 is a block diagram of a verifiable electronic journal including hashing according to an embodiment of the present invention.

Data hashing operations as applied to the present invention are further schematically illustrated in FIG. 4. As shown in FIG. 4, nonvolatile random access memory 120 includes a portion for operation as an electronic journal buffer 122 and a portion 124 maintaining the running message digest associated with hash function 126 and data blocks passing through electronic journal buffer 122. As illustrated in FIG. 4, hash blocks #1 through #N pass successively through electronic journal buffer 122, are transmitted to electronic journal file 50 on the point of sale terminal and are further passed through hash function 126 to update the running, message digest 124. NVRAM 120 and hash function 126 are included in point of sale device 118. As illustrated in FIG. 4, hash function 126 uses the current running message digest 124 and the most recent hash block #X being transferred to generate an updated message digest which is, in turn, iteratively stored as the running message digest in portion 124 of nonvolatile random access memory 120.

Figure 5:
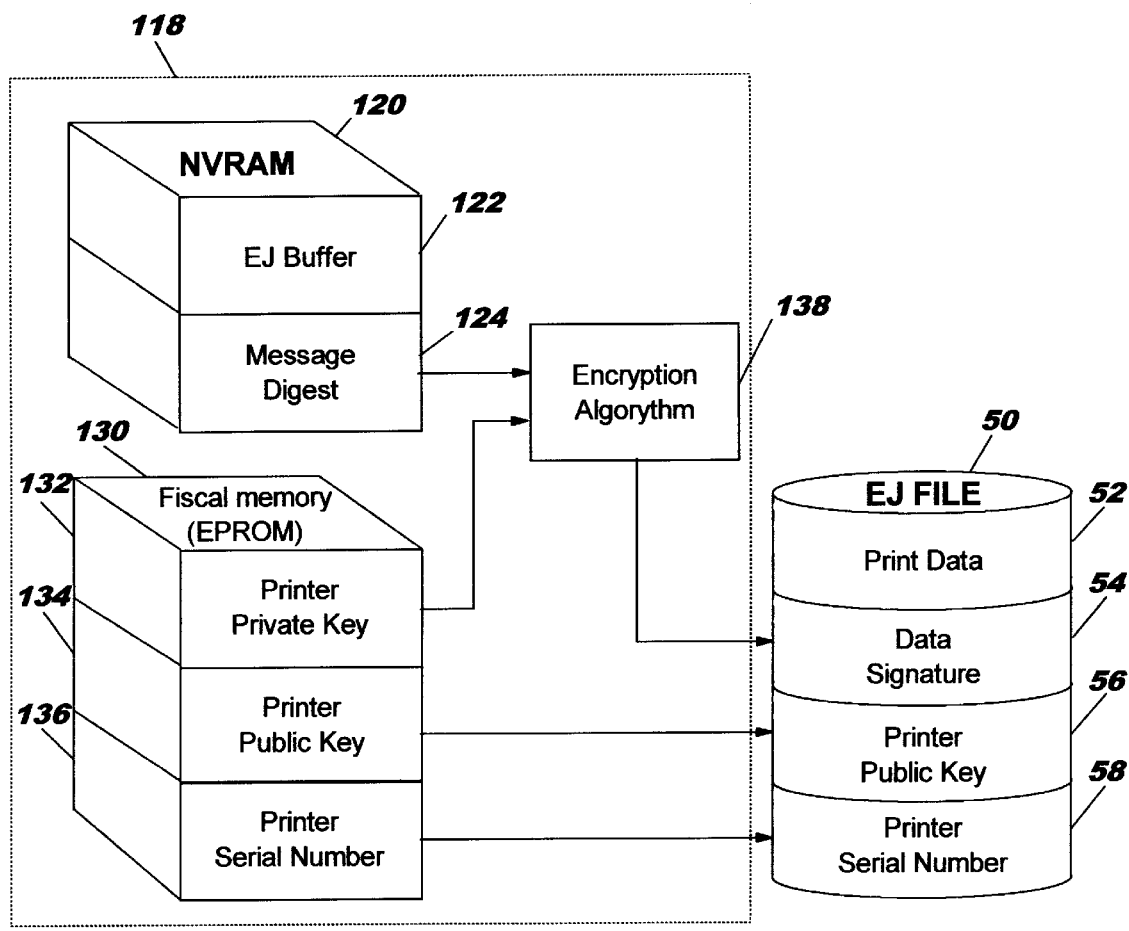
FIG. 5 is a block diagram of a verifiable electronic journal point of sale device according to an embodiment of the present invention.

Referring now to FIG. 5, operations illustrated in blocks 114 through 116 for signature creation and file completion at the end of a journal period are further illustrated for an embodiment of a point of sale device 118 according to the present invention. The closing operations taking place at the point of sale terminal in the illustrated embodiment of FIG. 5 result in an electronic journal memory or file which is closed so that no alterations may be made which cannot be detected using the authentication techniques described herein. In the embodiment illustrated in FIG. 5, printer private key 132, printer public key 134 and printer serial number 136 are all stored in portions of electronically programmable read only fiscal memory 130. At the end of a journal period, the printer private key 132 and message digest 124 are used by encryption algorithm 138 to generate a data signature which is stored in the data signature portion 54 of the electronic journal file 50. The printer public key 134 and printer serial number 136, respectively, are transferred and stored in portions 56 and 58 respectively of the electronic journal file 50.

As can be seen from the illustrated embodiment's use of both fiscal memory and nonvolatile RAM 130, 120, the systems and methods of the present invention can be implemented using hardware such as the fiscal base 24 discussed previously with reference to FIG. 1. In this case, random access memory 30 may be provided with a portion dedicated to serve as NVRAM 120. Furthermore, fiscal memory EPROM 34 may be utilized to store the encryption information for use in encrypting the message digest to provide an encrypted data signature.

Figure 1:
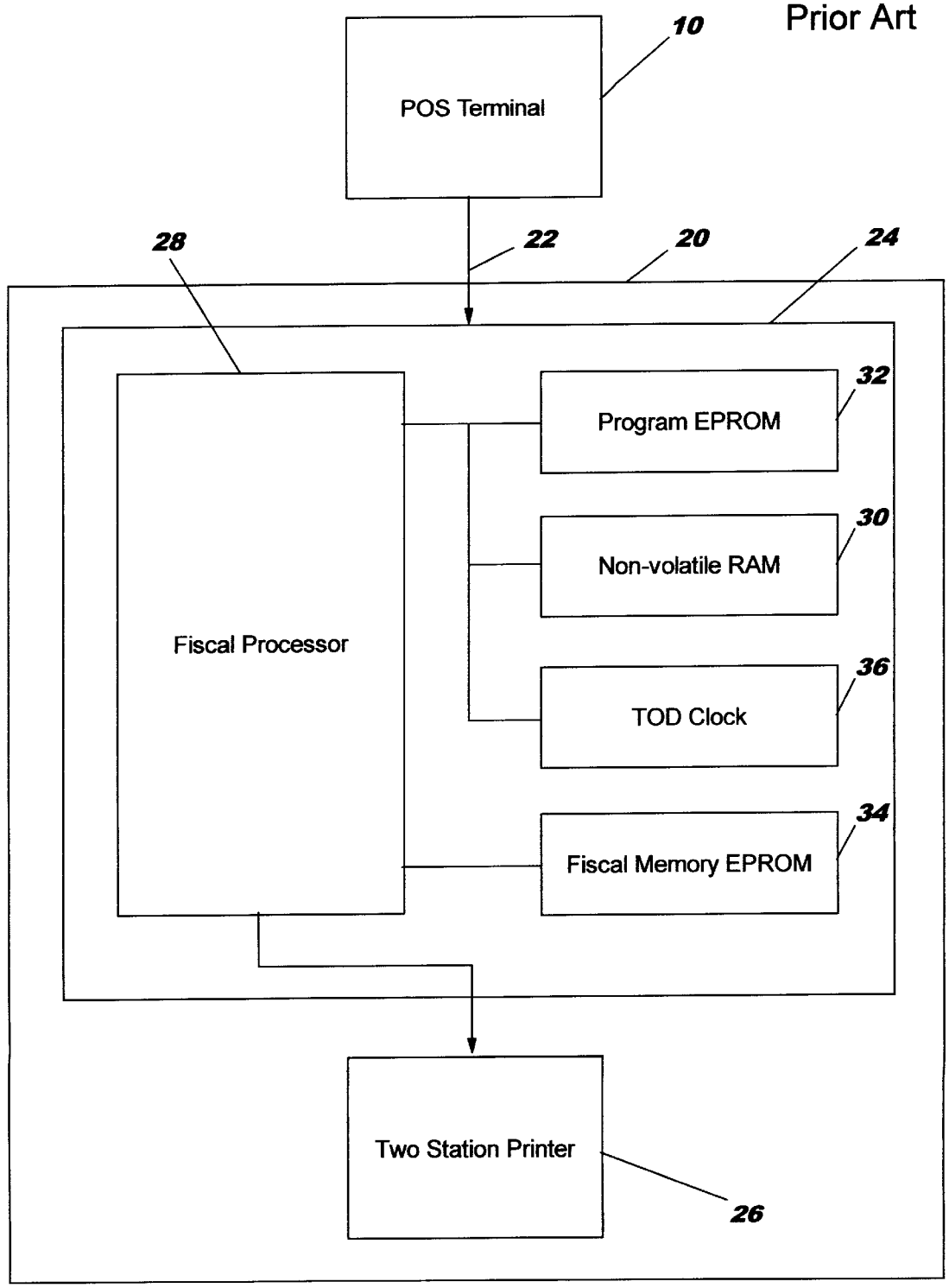
FIG. 1 is a block diagram of a conventional fiscal printer device.

As will be appreciated by those of skill in this art, the above-described aspects of the present invention in FIGS. 2, 4 and 5 may be provided by hardware, software, or a combination of the above. While various components of the point of sale device 118 have been illustrated in FIGS. 4 and 5, in part, as discrete elements, they may, in practice, be implemented by a microcontroller including input and output ports and running software code, by custom or hybrid integrated circuits, by discrete components or by a combination of the above. For example, memory 120 may be contained within a processor such as fiscal processor 28 (FIG. 1). Similarly, various of the operations, such as the hashing function 126 and the encryption algorithm 138 may be implemented within a processor such as fiscal processor 28 (FIG. 1). More generally, as described above, operations according to the present invention may be realized in the hardware of existing fiscal bases 24 which, when so configured, provide a point of sale device according to the present invention.

Figure 6:
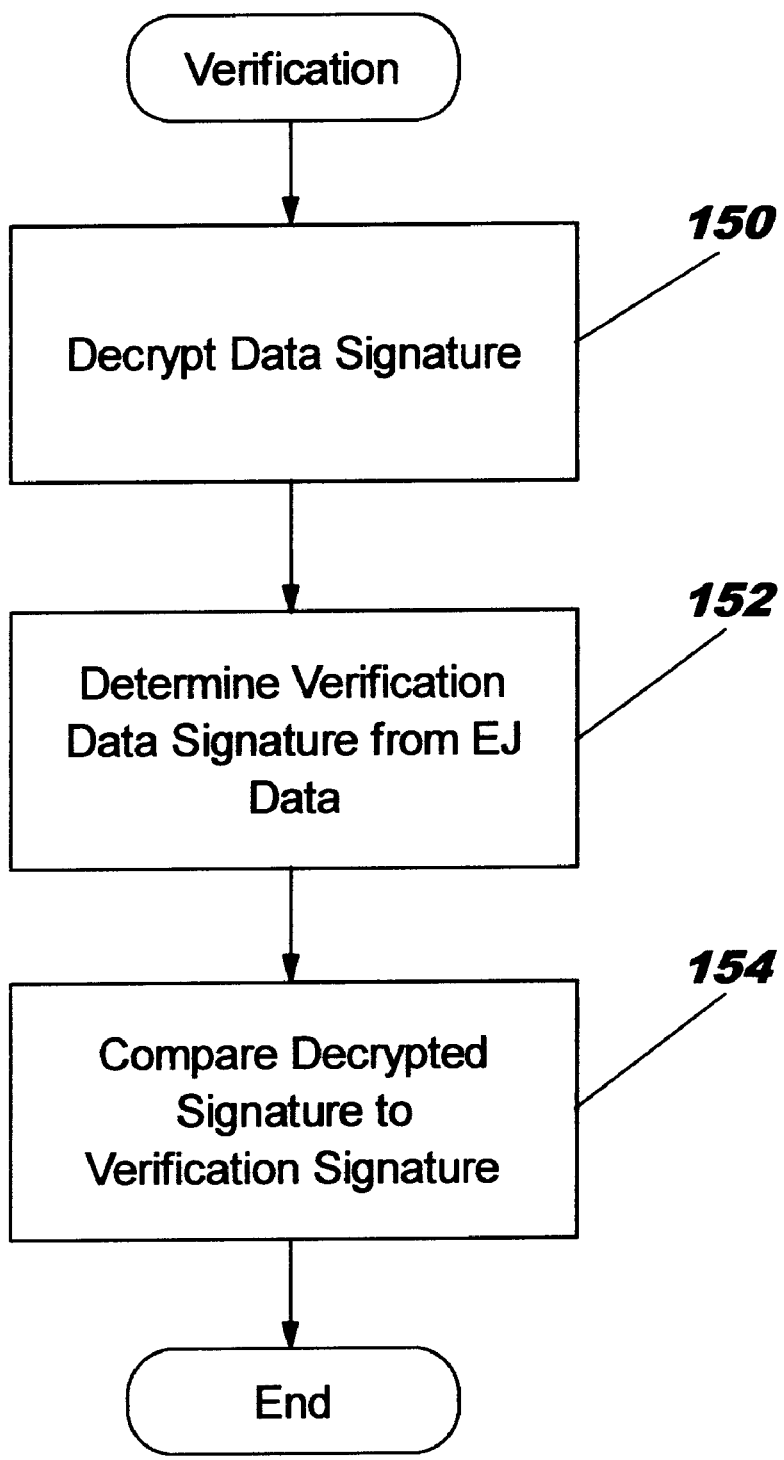
FIG. 6 is a flowchart illustrating verification operations according to an embodiment of the present invention.

Referring now to FIG. 6, operations for auditing the verifiable electronic journal system will now be described for an embodiment of the present invention. At block 150, the data signature contained in the journal memory is decrypted using the shared key contained in the journal memory by applying the agreed on encryption algorithm 138 (FIG. 5). At block 152, a verification data signature is determined from the transaction information contained in the electronic journal data portion 52 using the agreed hash function 126. Finally, at block 154, the verification data signature is compared to the decrypted data signature to determine if the transaction information in the journal memory has been modified from the transaction information which was originally transferred from the random access memory of the acquiring point of sale device, such as the fiscal base, during the journal period. If the two values do not match, then the print data in portion 52 of the electronic journal 50 is not verified indicating that the data in portion 52 may have been tampered with.

The verifiable electronic journaling methods and systems of the present invention enable the generation of a secure fiscal journal file at the point of sale terminal as any tampering with the journal data can be detected. Operations according to the present invention can generally be implemented within the hardware design structure of currently engineered fiscal base devices with the advantage of not requiring that such fiscal base devices include a two station print capability for generating a paper journal. Furthermore, operations according to the present invention utilize hashing and upstream maintenance of the electronic journal file, thereby allowing existing fiscal memory sizes to be maintained. Transaction information need not be written to the fiscal device's electronically programmable read only memory as the journal file is both maintained and verifiable remote from the fiscal base unit. However, fiscal memory may continue to be utilized to provide functions such as those presently provided by known fiscal printer devices. Accordingly, when the methods of the present invention are implemented concurrently with use of a fiscal memory EPROM device such as that illustrated in FIG. 1, the lifetime of a given sized fiscal memory EPROM 34 is not affected by electronic journaling activities.

The methods and systems of the present invention further provide improved capabilities as the electronic journal may be located either at the point of sale terminal or in a device, such as a networked computer, which is remote from the terminal but may be connected to the terminal or a fiscal base using a network interface. Accordingly, verification operations may be implemented not only without use of the fiscal base device or printer, but may even be implemented from a location remote from the point of sale terminal or other location where the electronic journal is maintained.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for providing a verifiable electronic journal system for a point of sale device comprising:
   receiving transaction information related to a plurality of sales transactions;
   storing the transaction information in a random-access memory;
   determining a data signature based on the transaction information contained in the random access memory and a previously determined data signature responsive to a journal update event;
   transferring the transaction information contained in the random-access memory to a first portion of a journal memory separate from the random-access memory responsive to the journal update event; and
   transferring the data signature to a second portion of the journal memory responsive to the journal update event.

2. A method according to claim 1 further comprising the step of transmitting the transaction information to a printer for printing.

3. A method according to claim 1 wherein the transaction information includes sales amount information on transactions and wherein the receiving step is followed by the step of calculating a tax clue based on the sales amount information.

4. A method according to claim 1 wherein the transaction information includes a tax due.

5. A method according to claim 1 further comprising the step of generating the journal update event responsive to completion of a journal period.

6. A method according to claim 1 further comprising the step of generating the journal update event when a predetermined amount of transaction information is stored in the random access memory and wherein the step of transferring the transaction information is followed by the step of reusing the random-access memory to store additional transaction information by overwriting previously stored transaction information.

7. A method according to claim 6 wherein the step of generating the journal update event comprises the step of generating a plurality of journal update events during a journal period and wherein the steps of storing the transaction information, determining a data signature, transferring the transaction information, transferring the data signature and reusing the random-access memory are repeated for each of the journal update events during the journal period according to a hashing technique thereby periodically transferring a block of transaction information stored in the random-access memory to the journal memory while determining the data signature as a running value associated with the transaction information received during the journal period wherein the previously determined data signature comprises a running value associated with the transaction information received during the journal period up to a last generated one of the plurality of journal update events.

8. A method according to claim 7 wherein the step of determining a data signature is followed by the steps of:
   encrypting the data signature using a shared key; and
   transferring the shared key to a third portion of the journal memory responsive to at least one of the plurality of journal update events.

9. A method according to claim 8 wherein th e step of transferring the shared key is followed by the step of auditing the verifiable electronic journal system.

10. A method according to claim 9 wherein the step of auditing the verifiable electronic journal system comprises the steps of:
    decrypting the data signature in the second portion of the journal memory using the shared key in the third portion of the journal memory;
    determining a verification data signature from the transaction information in the first portion of the journal memory using the hashing technique; and
    comparing the verification data signature to the decrypted data signature to determine if the transaction information in the first portion of the journal memory has been modified from the transaction information transferred from the random-access memory during the journal period.

11. A method according to claim 1 wherein the step of determining a data signature is followed by the steps of:
    encrypting the data signature using a shared key; and
    transferring the shared key to a third portion of the journal memory responsive to at least one of the plurality of journal update events.

12. A method according to claim 11 wherein the step of transferring the shared key is followed by the step of auditing the verifiable electronic journal system.

13. A method according to claim 12 wherein the step of auditing the verifiable electronic journal system comprises the steps of:
    decrypting the data signature in the second portion of the journal memory using the shared key in the third portion of the journal memory;
    determining a verification data signature from the transaction information in the first portion of the journal memory; and
    comparing the verification data signature to the decrypted data signature to determine if the transaction information in the first portion of the journal memory has been modified from the transaction information transferred from the random-access memory during the journal period.

14. A point of sale device having a verifiable electronic journal system comprising:
    means for receiving transaction information related to a plurality of sales transactions;
    means for determining a journal update event;
    a random-access memory coupled to the means for receiving and configured to store the transaction information;
    means responsive to the journal update event for determining a data signature based on the contents of the random access memory and a previously determined data signature;

a journal memory having a first portion configured to store the transaction information and a second portion configured to store the data signature; and means responsive to the journal update event for transferring transaction information from the random-access memory to the first portion of the journal memory and the data signature from the means for determining a data signature to the second portion of the journal memory.

15. A system according to claim 14 further comprising interface means for connecting the point of sale device to a point of sale printer configured to print information on the plurality of transactions.

16. A system according to claim 14 wherein the programable journal memory is contained within the point of sale device.

17. A system according to claim 14 wherein the programable journal memory is located on a computer remote from the point of sale device and wherein said means for transferring further comprises network interface means for communicatively connecting the point of sale device to the computer remote from the point of sale device.

18. A system according to claim 14 wherein the transaction information includes a tax due.

19. A system according to claim 14 wherein the means for generating a journal update event comprises means for generating a journal update event responsive to the completion of a journal period.

20. A system according to claim 14 wherein the means for generating a journal event comprises means for generating the journal update event when a predetermined amount of transaction information is stored in the random access memory and further comprising hashing means for reusing the random-access memory to store additional transaction information by overwriting previously stored transaction information.

21. A system according to claim 14 wherein the means for generating a journal event comprises means for generating a plurality of journal update events during a journal period and further comprising hashing means for transferring a block of transaction information stored in the random-access memory to the journal memory responsive to each of the plurality of journal update events while determining the data signature as a running value associated with the transaction information received during the journal period wherein the previously determined data signature comprises a running value associated with the transaction information received during the journal period up to a last generated one of the plurality of journal update events.

22. A system according to claim 21 further comprising means for encrypting the data signature using a shared key and wherein the programable journal memory further has a third portion configured to store the shared key and further comprising means for transferring the shared key to the third portion of the journal memory responsive to at least one of the plurality of journal update events during the journal period.

23. A system according to claim 22 further comprising interface means for allowing access to the journal memory wherein the journal memory may be verified by a user auditing the verifiable electronic journal system using the shared key to decrypt the data signature and comparing the decrypted data signature to a verification data signature generated from transaction information in the first portion of the journal memory.

24. A system according to claim 14 further comprising means for encrypting the data signature using a shared key and wherein the programable journal memory further has a third portion configured to store the shared key and further comprises means for transferring the shared key to the third portion of the journal memory.

25. A system according to claim 24 further comprising interface means for allowing access to the journal memory wherein the journal memory may be verified by a user auditing the verifiable electronic journal system using the shared key to decrypt the data signature and comparing the decrypted data signature to a verification data signature generated from transaction information in the first portion of the journal memory.

26. A system according to claim 14 wherein the journal memory is an electronically programmable read only memory device and wherein the random-access memory is a non-volatile random-access memory device.

27. A computer program product for maintaining a verifiable journal system for a point of sale device, the computer program product comprising a computer usable storage medium having computer readable program code embodied in the medium, the computer readable program code comprising:

computer readable program code that receives transaction information related to a plurality of sales transactions;

computer readable program code that determines a journal update event;

computer readable program code that stores the transaction information in a random-access memory;

computer readable program code that determines a data signature based on the transaction information contained in the random-access memory and a previously determined data signature responsive to the journal update event;

computer readable program code that transfers the transaction information contained in the random-access memory to a first portion of a journal memory separate from the random access memory responsive to the journal update event;

computer readable program code that transfers the data signature to a second portion of the journal memory responsive to the journal update event.

28. A computer program product according to claim 27 further comprising computer readable program code that transmits the transaction information to a printer for printing.

29. A computer program product according to claim 27 wherein the transaction information includes sales amount information on transactions and further comprising computer readable program code that calculates a tax due based on the sales amount information.

30. A computer program product according to claim 27 wherein the transaction information includes a tax due.

31. A computer program product according to claim 27 further comprising computer readable program code that generates the journal update event responsive to completion of a journal period.

32. A computer program product according to claim 27 wherein the computer readable program code that generates a journal event comprises computer readable program code that generates the journal update event when a predetermined amount of transaction information is stored in the random access memory and further comprising computer readable program code that reuses the random-access memory to store additional transaction information by overwriting previously stored transaction information.

33. A computer program product according to claim 27 wherein the computer readable program code that generates a journal event comprises computer readable program code that generates a plurality of journal update events during a journal period and further comprising computer readable program code that transfers a block of transaction information stored in the random-access memory to the journal memory responsive to each of the plurality of journal update events while determining the data signature as a running value associated with the transaction information received during the journal period wherein the previously determined data signature comprises a running value associated with the transaction information received during the journal period up to a last generated one of the plurality of journal update events.

34. A computer program product according to claim 33 further comprising computer readable program code that encrypts the data signature using a shared key and and further comprising computer readable program code that transfers the shared key to a third portion of the journal memory responsive to at least one of the plurality of journal update events during the journal period.

35. A computer program product according to claim 34 further comprising computer readable program code that allows access to the journal memory wherein the journal memory may be verified by a user auditing the verifiable electronic journal system using the shared key to decrypt the data signature and comparing the decrypted data signature to a verification data signature generated from transaction information in the first portion of the journal memory.

36. A computer program product according to claim 27 further comprising computer readable program code that encrypts the data signature using a shared key and further comprising computer readable program code that transfers the shared key to a third portion of the journal memory.

37. A computer program product according to claim 36 further comprising computer readable program code that allows access to the journal memory wherein the journal memory may be verified by a user auditing the verifiable electronic journal system using the shared key to decrypt the data signature and comparing the decrypted data signature to a verification data signature generated from transaction information in the first portion of the journal memory.

38. A computer program product according to claim 27 wherein the journal memory is an electronically programmable read only memory device and wherein the random-access memory is a non-volatile random-access memory device.

39. A verifiable electronic journal system for a point of sale device, the system comprising:

an interface circuit that receives transaction information related to a plurality of sales transactions;

a random-access memory coupled to the interface circuit and configured to store the transaction information;

a hash function, that determines a data signature based on the contents of the random access memory and a previously determined data signature responsive to a journal update event;

a journal memory having a first portion configured to store the transaction information and a second portion configured to store the data signature; and a transmit circuit that transmits transaction information from the random-access memory to the first portion of the journal memory and the data signature from the hash circuit to the second portion of the journal memory responsive to the journal update event.

40. A system according to claim 39 further comprising an encryption function that encrypts the data signature using a shared key and wherein the programmable journal memory further has a third portion configured to store the shared key and wherein the transmit circuit is further configured to transfer the shared key to the third portion of the journal memory responsive to at least one of a plurality of journal update events during a journal period.

* * * * *